United States Patent Office 3,345,841
Patented Oct. 10, 1967

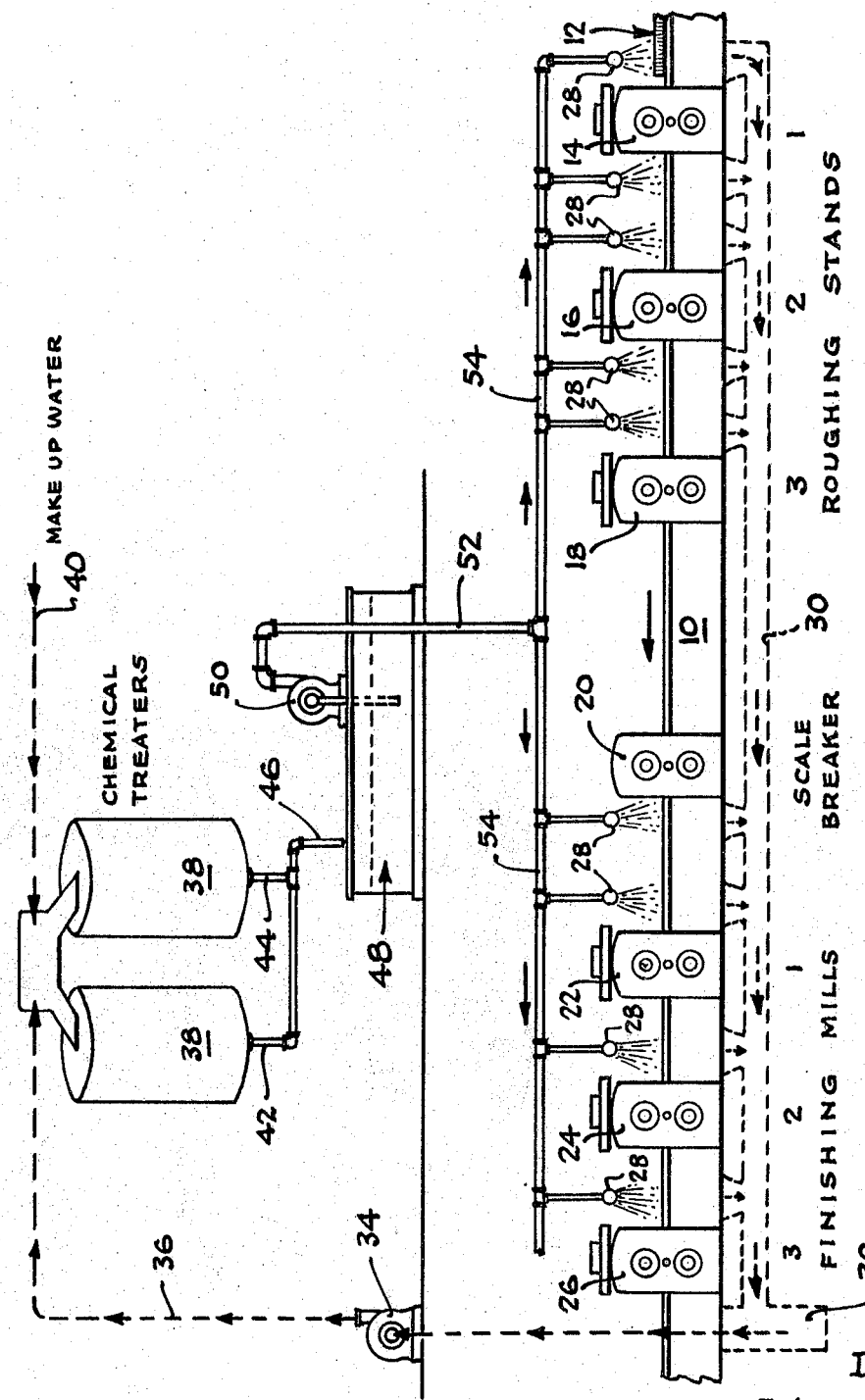

3,345,841
HOT STRIP ROLLING MILL
John E. Phelan, Euclid, Ohio, and John T. Burke, La Grange, Ill., assignors to Nalco Chemical Company, Chicago, Ill., a corporation of Delaware
Filed Aug. 23, 1965, Ser. No. 481,579
8 Claims. (Cl. 72—39)

This invention relates to an improved method for operating hot strip rolling mills.

The rolling of steel in hot strip mills has been practiced by the steel industry for a number of years. A typical hot strip mill will usually contain roughing stands, scale breakers, and finishing stands. The steel workpiece is continually passed into these units to be reduced and shaped into finished or semi-finished steel strip stock.

One of the inherent problems connected with hot strip rolling is mill scale which forms on the surface of the piece. This scale is occasioned by the heating of the workpiece prior to its rolling in reheat furnaces. This scale is chemically composed of the well known iron oxides, $FeO$, $Fe_2O_3$, $Fe_3O_4$.

To remove scale from the workpiece as it progresses through a hot strip mill, a number of scale-removing techniques and devices are used. Mechanical scale breakers are commonly found in these mills which remove scale by means of mechanical flexing. While scale breakers are effective to some extent in loosening scale, it is usually necessary to use in conjunction therewith high pressure water jets to abraid the loosened scale and remove it from the rolling area by a flushing action. These high pressure nozzles are frequently located before and after the scale breakers and are dispersed intermittently throughout the roughing and finishing operations.

Many of the high pressure nozzles used to flush and remove scale in a hot strip mill operate at relatively high pressure, e.g., 200–2000 lbs. per sq. in. When the pressure in these nozzles is reduced, or their spray patterns distorted by abrasive wear, their scale removal efficiency is substantially diminished.

The volumes of water used with the nozzles in scale removal processes is substantial. Many thousands of gallons of water are used per hour in operating these hydraulic scale-removing devices. It is customary to collect the water after it has been passed through the nozzle for re-use in the scale removing operations. This re-used water is contaminated with excessively large quantities of iron oxides which are detrimental to efficient operation of the nozzles. The suspended iron oxide particles when recycled through spray nozzles tend to plug the nozzles, thereby reducing their pressure which causes a diminution of their scale-removing efficiency. Also, the fine iron oxide particles exert an abrasive action upon the spray nozzles which in time distorts their spray pattern.

It would be of benefit to the hot strip rolling art if it were possible to improve the operational efficiency of the spray nozzle systems used in such operations whereby they could be operated for longer periods of time at adequate pressures and without loss or distortion of spray patterns. It thereby becomes an object of this invention to provide an improved method for the hot strip rolling of steel.

Another object of this invention is to improve the operational efficiency of the high pressure hydraulic spray nozzles used to loosen and remove scale from steel workpieces passing through a hot strip rolling mill.

Other objects will appear hereinafter.

To more fully understand the several inventive features which will be more fully described herein, reference may be had to the drawing which is a schematic illustration of a typical hot strip rolling mill.

With particular reference to the drawing, the hot strip rolling mill shown is composed of a work table 10 upon which a workpiece 12 is advanced through a plurality of roughing and finishing stands. As the workpiece is advanced from right to left, it passes through roughing stands 14, 16, and 18. It then progresses to scale breaker 20 and thence to a series of finishing stands 22, 24, and 26.

The workpiece 12 is coated with scale as a result of being brought up to an elevated temperature by prior treatment in reheating furnaces (not shown). Associated with the roughing stands, scale breakers and finishing stands are high pressure scale-removing nozzles 28. The spray from these nozzles is collected by a collection system which is depicted in the drawing as trough 30. The water in trough 30 flows by gravity into sump pit 32 from whence it is removed by means of centrifugal pump 34 through line 36 into the chemical treaters 38. Also, added to chemical treaters 38 is makeup water which flows through line 40. The water is treated in the chemical treaters to substantially remove the suspended iron oxide particles which heavily contaminate the water. By the use of proper chemical treatment means which will be more fully described hereinafter, the water leaves the chemical treaters through lines 42, 44, and 46. This water is relatively free of suspended solids.

As a major concept of this invention, the finished water has a turbidity (Helige $SiO_2$) which does not exceed 20 p.p.m. and preferably is less than 10 p.p.m. In addition to having a turbidity of less than the limit specified, the largest average particle size is not greater than 10 microns in dimension and preferably is less than 5 microns. The finished water having these important characteristics is then stored in well 48 from whence it is transferred by high pressure pump 50 through line 52 into distributing manifold 54 for re-use by the nozzles 28. By using water having the suspended solids characteristics thus specified, it is possible to maintain good pressure at spray nozzles 28 while at the same time preventing undue wear thereof which allows trouble-free operation of these hydraulic scale-removing devices.

The water which meets the previously mentioned specifications of average turbidity of less than 20 p.p.m. and with the largest average particle size being not greater than 10 microns is accomplished by treating the water in the chemical treaters 38 with polymeric, water soluble chemicals which may be inorganic or organic. The inorganic chemicals which in their undissolved state are not polymeric, break down to form polymeric metal oxides. Due to this breakdown and polymerization phenomenon, they are considered for present purposes as being colloidal salts. Illustrative compounds are aluminum sulfate (alum), ferrous sulfate, chlorinated copperas (chlorine oxidized ferrous sulfate), ferric sulfate, ferric chloride and sodium aluminate. Of these materials, the more preferred are ferric chloride and ferric sulfate. The preferred water soluble organic polymeric chemicals comprise a class of compounds designated generally as synthetic water dispersible polymers. Among these, the most preferred are those polymers which have an average molecular weight of at least 10,000 and have a polymeric structure derived by the polymerization of at least one mono-olefinic compound through an aliphatic unsaturated group. The water-dispersible synthetic polymers have a structure substantially free of crosslinkage, therefore being available for solubilization or dispersion in the particular aqueous liquid to be treated. Treating agents found to be especially effective for the purpose of the invention are water-dispersible synthetic polymers having a linear hydrocarbon structure and containing in a side chain, a hydrophilic group from the class consisting of carboxylic acid, carboxylic acid anhydride, carboxylic acid amide, hydroxy, pyridine, pyrrolidone, hydroxy alkyl ether, alkoxy, and carboxylic acid salt groups.

The organic treating agents which are effective for the purpose of the invention fall into three classes; namely (1) those consisting of polymeric organic substances which in an aqueous medium will form organic anions having a substantial number of negative electrical charges distributed at a plurality of positions on the polymer; (2) those consisting of polymeric organic substances which in an aqueous medium will form organic cations having a substantial number of positive charges distributed at a plurality of positions on the polymer; and (3) those consisting of polymeric organic substances which in an aqueous medium will not form ions but nevertheless contain a sufficient number of hydrophilic groups to be water-dispersible. The first class of materials is referred to herein as anionic organic polymers, the second class is referred to herein as cationic organic polymers, and the third class is referred to herein as non-ionic organic polymers. The first two classes can also be referred to as polyelectrolytes.

The term "polyelectrolyte" is intended to cover synthetic organic polymers which in an aqueous medium will form organic ions having a substantial number of electrical charges distributed at a plurality of positions.

The synthetic organic polymers containing only carboxylic acid, carboxylic acid anhydride, and carboxylic acid salt groups in a side chain are anionic. The synthetic organic polymers containing only pyridine or other similar nitrogen-containing nucleus, are cationic. The synthetic organic polymers containing only a carboxylic acid amide, pyrrolidone, a hydroxy, a hydroxy alkyl ether and/or an alkoxy group in a side chain are non-ionic. The invention contemplates the employment of polymers which contain anionic, cationic, and/or non-ionic groups. It also contemplates the employment of mixtures of anionic, cationic, and/or non-ionic water-dispersible synthetic organic polymers.

An important class of organic treating agents employed for the purpose of the invention consists of the synthetic polymeric water-soluble polyelectrolytes having an average molecular weight greater than 10,000 which are copolymers of compounds containing the group:

$$-\overset{O}{\underset{\|}{C}}-CH=CH-\overset{O}{\underset{\|}{C}}-$$

and at least one other mono-olefinic monomer.

Another important class of treating agents employed for the purpose of the invention consists of synthetic water-soluble polyelectrolytes having a weight average molecular weight of at least 10,000 which are polymers of a compound containing the molecular group:

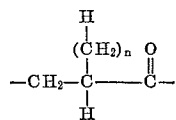

where $n$ is an integer of 0 to 1.

The following water-dispersible synthetic organic polymers and their characteristic grouping illustrate the types of polymers which have been found to be effective for the practice of the invention.

| Number | Name | Characteristic Grouping |
|---|---|---|
| 1 | Polyacrylate sodium salt. | —CH₂—CH—<br>         \|<br>        COO (−)<br>        Na (+) |
| 2 | Polymethacrylic acid copolymer sodium salt. | 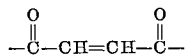 |
| 3 | Maleic anhydride-vinyl acetate. | —CH—CH₂—CH——CH—<br>  \|          O=C    C=O<br>  O             \\  /<br>  \|               O<br>CH₃C=O |
| 4 | Polyvinyl methyl ether-maleic anhydride. | —CH—CH₂—CH——CH—<br> \|          O=C   C=O<br>OCH₃      \\  /<br>                O |
| 5g | Methacrylic acid |       CH₃         CH₃<br>       \|               \|<br>—CH₂C——CH₂——C<br>       \|              \|<br>     COO (−)  CONH₂<br>      H (+) |
| 6 | Polyacrylic acid | —CH₂—CH—<br>         \|<br>        COO (−)<br>         H (+) |
| 7 | Isopropenyl acetate-maleic anhydride sodium salt. |       CH₃<br>       \|<br>CH₂—C——CH——CH<br>       \|     C=O  C=O<br>       O     \|        \|<br>CH₃C=O  O (−)  O (−)<br>              Na (+)  Na (+) |
| 8 | Itaconic acid-vinyl acetate. | COO (−)<br>   \|<br>—C—CH₂——CH₂—CH—<br>   \|                 \|<br>CH₂COO(−)     O<br>     H(+)   CH₃C=O |
| 9 | Polyvinyl pyridine-hydrochloride. | —CH₂—CH—<br>         \|<br>     (pyridinium ring)<br>     NH(+)  Cl(−) |
| 10 | -methyl styrene-maleic anhydride sodium salt. |   CH₃<br>   \|<br>—C—CH₂—CH————CH—<br>   \|                  \|              \|<br> (phenyl)  COO(−)  COO(−)<br>              Na(+)   Na(+) |
| 11 | Polyvinyl pyrrolidone. |       H<br>      \|<br>   —C—CH₂<br>      \|<br>      N<br>H₂C    C=O<br>H₂C————CH₂ |
| 12 | Styrene-maleic anhydride sodium salt. |    H<br>   \|<br>—C—CH₂—CH————CH—<br>   \|                  \|              \|<br> (phenyl)  COO(−)  COO(−)<br>              Na(+)   Na(+) |
| 13 | Polyvinyl alcohol | —CH—CH₂—<br>   \|<br>  OH |
| 14 | Polyvinyl methyl ether. | —CH—CH₂—<br>   \|<br>  OCH₃ |
| 15 | Methylmethacrylate-maleic anhydride sodium salt. |   CH₃<br>   \|<br>—C—CH₂—CH————CH—<br>   \|                  \|              \|<br>COOCH₃  COO(−)  COO(−)<br>              Na(+)   Na(+) |
| 16 | Polyvinyl acetate emulsion. | —CH—CH₂—<br>   \|<br>  O<br>  \|<br>CH₃C=O |
| 17 | Acrylic acid styrene copolymer. | —CH₂—CH₂—CH—CH₂—<br>                  \|<br>            COO(−)<br>             H(+) |

Any of the polyelectrolytes disclosed in United States Patent No. 2,625,529 can be employed for the purpose of the invention. Where the copolymers are identified in terms of their monomeric constituents, it should be understood that the names applied to these copolymers refer to the molecular structure and are not limited to the polymers prepared by the copolymerization of specific monomers. In many cases, the identical copolymers can be prepared from other monomers and converted by subsequent chemical reaction to the desired copolymer.

Where the copolymer is derived from a polycarboxylic acid derivative and at least one other monomer copolymerizable therewith, the polycarboxylic acid derivative may be maleic anhydride, maleic acid, fumaric acid, itaconic acid, aconitic acid, citraconic acid, the amides of these acids, the alkali metal (e.g., sodium, potassium, and lithium), the alkaline earth metal (e.g., magnesium, calcium, barium, and strontium), and ammonium salts of these acids, the partial alkyl esters (e.g., methyl, ethyl, propyl, butyl, mono esters), the salts of said partial alkyl esters, and the substituted amides of these polycarboxylic acids. Where the hydrophilic maleic acid derivatives are used as one of the starting components to form the copolymer, the hydrophobic comonomers may be, for instance, styrene, alpha-methyl styrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene.

The foregoing synthetic copolymers are preferably obtained by reacting equimolar proportions of a polycarboxylic acid derivative and at least one other monomer. However, certain of the hydrophilic derivatives of unsaturated polycarboxylic acids can be polymerized in less than equimolar proportions with some of the less hydrophobic comonomers, for example, vinyl formate and vinyl acetate.

Some of the synthetic organic polymers and copolymers are more effective than others, the effectiveness being dependent in part upon the kind and number of said chain groupings in the particular polymer, the molecular weight thereof, and the type of suspension being treated. In general, for effective results the polymer listed above should have a relatively high molecular weight in excess of 10,000 and ordinarily within the range of 15,000 to 100,000.

Besides the above listed organic polymeric coagulants which may be conveniently said to be addition-type polymeric substances, it has been found that hydrophilic condensation type polymers are also particularly useful in the invention. The most preferred hydrophilic condensation polymer is one derived by the reaction of a polyalkylene polyamine with a polyfunctional halohydrin polymer. The resultant polymer is sufficiently hydrophilic so as to be soluble in water at the effective concentration.

The hydrophilic alkylene polyamine polyfunctional halohydrin polymer employed in accordance with the invention is particularly effective in producing coagulation and settling of certain types of suspensions of finely divided solids where it is employed in conjunction with another coagulant, as for example, sodium aluminate, clays such as bentonite, aluminum sulfate (alum), iron sulfate, sodium polyacrylate (or other anionic water-soluble polymeric coagulant), lime or a combination of any two or more of these coagulants.

A particularly useful embodiment of the invention is the employment of the hydrophilic alkylene polyamine polyfunctional halohydrin polymer in combination with high molecular weight water-soluble anionic polymers of the type listed above, which have a molecular weight of at least 10,000 and have a structure derived by the polymerization of at least one mono-olefinic compound through the aliphatic unsaturated group, said structure being substantially free of cross-linking.

The hydrophilic alkylene polyamine polyfunctional halohydrin polymers are reaction products of alkylene polyamines with polyfunctional halohydrins such as dihalohydrin, e.g., alphadichlorohydrin, dibromohydrin, or diiodohydrin, or any of the corresponding monohalohydrins containing a second functional group capable of reacting with an amino nitrogen atom of the alkylene polyamine, such as, for example, epichlorohydrin, epibromohydrin, and the like. These polymers may be considered as cationic materials.

The alkylene polyamines which are reacted with the polyfunctional halohydrins for the purpose of the invention are well known compounds having the general formula:

$$H_2N(C_nH_{2n}NH)_xH$$

where $n$ is an integer and $x$ is 1 or more. Examples of such alkylene polyamines are the alkylene diamines, such as ethylenediamine, 1,2-propylenediamine, and the polyalkylene polyamines, such as, for example, diethylenetriamine, triethylenetetramine, tetraethylenepentamine, dipropylenetriamine, and the similar polypropylene polyamines and polybutylene polyamines.

It has been known for many years that polyfunctional halohydrins react with amines including polyamines to form both monomeric and polymeric reaction products. The first stage of the reaction apparently results in the condensation of the halohydrin with the amine to produce a simple monomer. Thus, one mole of epichlorohydrin probably reacts with one mole of diethylenetriamine according to the following equation:

(1) 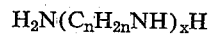

Epichlorohydrin      Diethylenetriamine

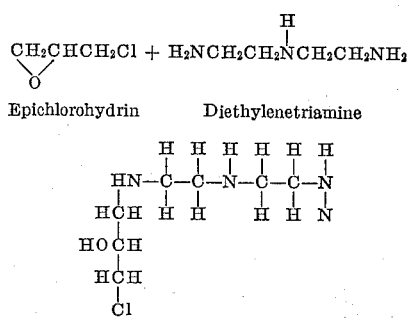

Obviously, the epichlorohydrin can react with both primary amino groups and also with the secondary amino group in the diethylentriamine and it is possible for some or all of these reactions to take place simultaneously. Furthermore, the simple monomer unit indicated as the end product of Equation 1 can react with other similar units to produce polymers containing recurring units. If the reaction is carried far enough, crosslinkage can occur, which is evidenced by gel formation. For purposes of the present invention, however, it is essential to avoid water-insoluble resin or gel formation. Yet the condensation-polymerization must be carried sufficiently far to thicken or increase the viscosity of the resultant product but insufficiently far to produce a water-insoluble gelatinous product.

The hydrophilic condensation type polymers of the type illustrated above employed for the purpose of the invention are of a relatively high molecular weight, which is believed to be in excess of 1000 but in most cases greater than 2000. Because of the difficulty of determining molecular weight, the most satisfactory way of ascertaining the proper amount of condensation and polymerization to obtain optimum results in coagulation is by viscosity measurement. The products which have been found to be especially suitable for the practice of the invention have a minimum viscosity of about 7 centipoises in an aqueous alkaline (about 12.6 pH) solution containing 20% by weight of the condensation polymer at a temperature of 75° F. The upper limit of the viscosity is anything short of gel formation and may be, for example, up to 150–600 centipoises. However, the preferred range of viscosity is about 14–19 centipoises.

Aqueous solutions of the condensation polymers are normally alkaline in pH. Stable solutions have been prepared having a pH range within the range of 7.6 to 13.0. The preferred pH range is from 10.5 to 12.8 with the most preferred pH range being from 11.7 to 12.6. pH ranges above 10.5 are not corrosive to steel shipping containers. The higher pH ranges above 10.5 are obtained by adding a caustic alkali (e.g., NaOH or KOH) to the condensation polymer. It has been observed that viscous polymers, alkaline in pH, could oftentimes be substantially reduced in their viscosity by treatment with mineral acids.

When the alkylene polyamine-polyfunctional halohydrin condensation polymer is used for coagulating suspensions of finely divided solids, a typical dosage range is around 10 to 20 parts of a 20% solution of the polymer per million parts of the suspension. When it is used in conjunction with bentonite, alum, iron sulfate, or sodium aluminate, the dosage usually found most effective is within the range of 1 to 5 p.p.m. A particularly effective combination of bentonite of the type shown in Ryznar, U.S. Patent 2,420,340, and Lindsay et al., U.S. Patent 2,284,827, and a polymer of the type herein described. Excellent results have been obtained using the combinations under extremely difficult coagulation conditions.

The dosage of the alkylene polyamine-polyfunctional halohydrin condensation polymer will vary depending upon the particular type of system to be treated. For example, if 8 p.p.m. is the optimum dosage, in some instances poor results will be obtained with 16 p.p.m. or 2 p.p.m. High dosages may be particularly ineffective and may have a dispersing rather than a coagulation effect. The final effective dosage may be found to be as low as 0.25 p.p.m. Thus, it is essential to make preliminary tests in order to determine the optimum dosage.

For convenience, the condensation polymer is preferably prepared at a concentration of around 40% and then diluted with water to a concentration of about 20% polymer solution. A 20% solution may increase very slightly in coagulation activity upon aging, but a very dilute solution (e.g., 0.35% solution) displays no noticeable change in activity upon aging. For practical purposes, it is desirable to use the polymer as a 20% solution because this concentration is sufficiently high to avoid shipping large quantities of water and sufficiently low to permit accurate proportioning of the correct amounts. Such solutions are also stable for relatively long periods of time.

The relative proportions of polyamine and polyfunctional halohydrin employed in making polyamines for the purpose of the invention can be varied depending upon the particular type of polyamine and polyfunctional halohydrin and the reaction condition. In general, it is preferable that the molar ratio of the polyfunctional halohydrin to polyamine be in excess of 1:1 and less than 2:1. Thus, in the preparation of a condensation polymer solution from epichlorohydrin and tetraethylenepentamine, good results have been obtained at a molar ratio of 1.4:1 to 1.94:1.

The following examples in which the quantities are given in parts by weight unless otherwise indicated, illustrate preferred compositions coming within the scope of the invention and their use for the purpose of the invention.

EXAMPLE 1

A condensation polymer was prepared from the following reactants:

| Ingredient: | Parts by wt. |
| --- | --- |
| Tetraethylenepentamine | 10.3 |
| Epichlorohydrin | 9.7 |
| Water (added prior to reaction) | 25.3 |
| Water (added after reaction is complete) | 54.7 |

The tetraethylenepentamine was dissolved in a volume of water equal to 25.3% of the batch weight. While the solution was being stirred, the epichlorohydrin was added slowly over a 1.5 hour period. During this addition, the temperature of the reaction was maintained between 45° C. and 50° C. with cooling. The reaction mixture was allowed to stand for an additional ½ hour with stirring at the same temperature. It was then diluted with the remainder of the water and cooled to room temperature (about 190° C.). The resultant solution contained about 25% by weight of active polymer and had a pH of 7.6.

In addition to the above preferred condensation type polymer, many other condensation type polymers are also admirably suited for use in the invention. Several illustrative classes of polymers are set forth below:

A. *Hydrophilic amine-aldehyde and amide-aldehyde polymers or resins*

Effective water-soluble polymers or resins are to be found among the class consisting of cationic amine-aldehyde resins and amide-aldehyde resin, preferably hydrophilic melamine-formaldehyde resins or hydropholic urea-formaldehyde resins.

The cationic resins are resinous materials carrying a positive electrical charge when in aqueous solution. For example, cationic melamine-aldehyde resins are resinous materials containing melamine and carrying a positive electrical charge when in aqueous solution.

Colloidal resin solutions may be prepared by dissolving ordinary melamine-aldehyde condensation products, such as methylol melamines, in acids such as hydrochloric acid, to form acidified or acid-type resin solutions having a glass electrode pH value within the range of about 0.5 to about 3.5 when measured at 15% solids, or pH values up to 4.5 when measured in more dilute solutions, followed by aging to the colloidal condition, as described in U.S. Patent 2,345,543.

Another class of cationic melamine-aldehyde resins that may be used in practicing the present invention are the resinous copolymers of melamine, urea, and aldehydes such as formaldehyde containing at least 0.7 mole of melamine for each 4 moles of urea and about 1 to 4 moles of combined formaldehyde for each mole of melamine plus urea. Such resins are described in U.S. Patent 2,485,079. These cationic melamine resin copolymers are obtained by first preparing an acidified aqueous solution of an aldehyde condensation product of melamine and urea containing 1 to 70 mole percent of urea and 30 to 99% of melamine and about 0.2 to 1.5 moles of acid per mole of melamine, depending on the strength of the acid, and aging the solution until the colloidal cationic condition is reached.

B. *Water soluble polyamines and polyimines*

These polymers are condensation products of either (a) dihaloalkanes and ammonia, (b) autocondensation products of alkyleneimines or (c) condensation products of polyalkylene polyamines and formaldehyde.

The condensation products of ammonia and alkylene dihalides such as ethylene and propylene dichloride produces a series of polyalkylene polyamines which are well-known and commercially available materials. Such chemicals are exemplified by the compounds: ethylene diamines, diethylenetriamine, triethylenetetramine and tetraethylenepentamine. The higher alkyl homologues and crude mixtures of several of these amines are also included as materials capable of use in the invention.

The polyimines are derived, for example, by the homopolymerization of monomers containing the imino radical,

and have a molecular weight of at least 1000.

The monomers preferably employed contain not more than 7 carbon atoms. Of the monomers employed for making polyimines, some of those best suited for the purpose of the invention are classified as substituted ethylenimines and have the structural formula:

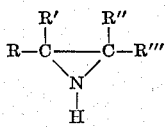

wherein R, R', R''' are either hydrogen or acyclic hydrocarbon radicals containing from 1 to 3 carbon atoms.

Examples of such monomers are the following:

A. Ethylenimine

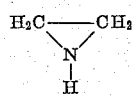

B. 1,2-propylene imine

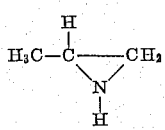

C. 1,2-butyleneimine

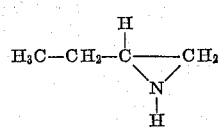

D. 2,2-dimethylethylenimine

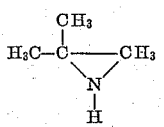

E. 2,3-butyleneimine

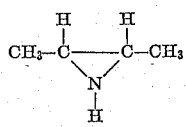

F. 1,1-dimethyl, 2-n-propylethyleneimine

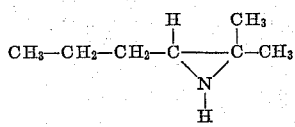

Other monomers capable of producing polymers suitable for the practice of this invention are trimethyleneimine which has the structural formula

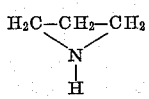

and its lower alkyl substituted derivatives in which one or more of the hydrogen atoms attached to a carbon atom is substituted by an alkyl group containing not more than 3 carbon atoms, i.e., methyl, ethyl, and propyl.

Ethylenimine, as well as many of its derivatives, may be prepared by any of several well known methods such as are described in the Journal of the American Chemical Society, vol. 57, p. 2328 (1935), and Ber. 21, 1094 (1888).

The polymerization of ethylenimine and its derivatives is usually conducted at reduced temperatures using acid catalysts such as HCl and the like. The polymerization of the various monomers listed above is described in detail in the Journal of Organic Chemistry, vol. 9, p. 500 (1944).

The linear polyimines are characterized by a long acyclic chain structure in which nitrogen atoms of imine groups are connected at intervals to carbon atoms. It will be recognized, therefore, that linear polyimines can be prepared not only by homopolymerization but also by condensation reactions with the elimination of a hydrohalide. Thus, ethylenedibromide or propylene dibromide can be condensed with diethylenetriamine, triethylenetetramine, tetraethylenepentamine, and/or dipropylenetriamine to produce polyimines, and the present invention contemplates the employment of such materials as coagulants.

In general, the polyimines employed in the practice of the invention can be described as water-soluble polyimines in which imino (—NH) groups are attached to carbon atoms and recur every two to three atoms in a main linear chain, preferably containing not more than 6 carbon atoms in any side chain. Where the imino groups are separated from each other by ethylene groups, the linear polyimines are referred to as polyethylenimines. Where the imino groups are separated from each other by the propylene groups, the linear polyimines are referred to as polypropylenimines.

The molecular weight of the useful polymer should be at least 1000 and is preferably from 5000 to 50,000. If the condensation reactions from which these polymers are derived are allowed to continue for too long a period of time or the conditions are not suitable, infusible, water-soluble resins may result. In the case of 2,2-dimethylethylenimine, care must be used to control the reaction so that the materials produced are water-soluble enough to be soluble at the effective concentrations.

Similarly, long chain water-soluble polymers may be prepared by condensing formaldehyde with a polyalkylene polyamine such as tetraethylene-pentamine to link the polyamines with a plurality of methylene bridges.

The above type condensation polymers may be generally described as water-soluble cationic polymers containing a plurality of cationic sites in a straight or branched or chain configuration. In addition to these cationic polymers, other suitable organic cationic coagulants may be used in practicing the invention. Of these, the most important is a class of compounds known generally as onium compounds. These onium compounds, useful as coagulants, are generally described as alkyl or aralkyl substituted quaternary onium compounds containing at least one acyclic hydrocarbon group of at least 9 carbon atoms in chain length.

The cationic substituted quaternary onium compounds and their use as coagulants are described in U.S. Patent 2,236,930, the disclosure of which is incorporated herein by reference. The preferred quaternary onium compounds are the quaternary ammonium compounds. Several commercially available quaternary ammonium compounds are: soya-trimethylammonium chloride, dimethyl ammonium chloride, tallow trimethyl ammonium chloride, lauryl trimethyl ammonium chloride, stearyl trimethyl ammonium chloride, and coconut trimethyl ammonium chloride. These compounds are manufactured and sold by the Armour Chemical Division under the trade name "Arquads."

In addition to the above described cationic and anionic organic coagulants, highly desirable results have been obtained when high molecular weight ethylene oxide polymers are used in combination with the magnetic particulate substance. These polymers have a viscosity in centipoises at 25° C. of from 500 to 30,000 when made up in one-half to five percent aqueous solutions. For best results, such polymers have molecular weights in excess of one million. The lower molecular weight materials have molecular weights starting about 200,000. These polymers are prepared by heating appropriate quantities of ethylene oxide with initiating molecules such as ethanol, ethylene glycol and the like in a sealed tube for six hours or more in the presence of a catalyst. Suitable catalysts include alkaline earth metal carbonates such as strontium or calcium carbonate. While ethylene oxide condensate polymers are the most preferred materials, other non-ionic, polypolar polymers are not precluded from use in the invention. The expression "polypolar polymers" refers to polymers having a plurality of non-ionized groups whereby said polymers are rendered hydrophilic. Such compounds for use with this invention desirably include polyacrylamide, polysubstituted acrylamide, polyvinyl alcohols, polyvinyl pyrrolidones and polyvinyl oxazolidones, as mentioned above.

Organic polymeric coagulants of vegetable origin may also be used to clarify water in the newly invented process covered in this application. These include water soluble or dispersible starches and starch derivatives, phosphated starches, Gum Ghatti, Jaguar, Locust Bean Gum, and other well known water-soluble vegetable gums and their derivatives. The vegetable derivatives may be used either alone or in combination with any of the above listed inorganic or synthetic organic coagulants.

The dosage of the organic or inorganic chemical may vary according to the particular system to be treated. In general, when an organic polymeric chemical is used, 0.1 to 60 p.p.m. of organic is used and sometimes more. On the other hand, when an inorganic substance is employed, the dosage varies from 5 to 200 p.p.m. with 10–80 p.p.m. being the preferred dosage. However, in more difficult cases involving systems containing suspended solids in very finely divided dispersions, much greater amounts of chemical are necessary.

Of the above materials, excellent results have been achieved by utilizing the cationic water-soluble condensation polymers prepared by condensing polyalkylene polyamines with halohydrins. Also useful are the acrylamide polymers having a molecular weight of at least 10,000.

It will be understood that the above materials may be used either alone or in combination with each other. A preferred combination are the polyamine-halohydrin polymers used in conjunction with iron salts.

To illustrate typical improvement in the operational efficiency of a hot strip steel rolling mill using high pressure hydraulic spray nozzles, the following is presented by way of example.

EXAMPLE II

In this particular hot strip operation, high pressure spray nozzles were located at the several roughing stands, scale breakers, and finishing stands. The nozzle pressures under normal operating conditions were at about 1850 lbs. per sq. in. The entire system used about 1650 gallons per minute of recirculated water. The water was removed from the spray operation and pumped into chemical clarifiers which were used to remove the suspended iron oxide particles.

Numerous combinations of chemicals were added to the turbid water which contained nearly 1000 p.p.m. of suspended solids. After numerous experiments it was discovered that an effective treatment comprised treating the water with 2 p.p.m. of a condensation polymer prepared in accordance with Example I, 15 p.p.m. of ferric chloride, and 10 p.p.m. of lime. The pH of the water was adjusted to 8.0. After running a conventional coagulation treatment and settling operation with rapid and slow mixing, the finished water had a turbidity of 8 p.p.m. with the particle size of such turbidity being less than 5 microns.

Before this treatment, the nozzles continually plugged and were badly abraded after a few weeks operation. With the treatment it was possible to maintain the nozzles in good working condition and at maximum operating pressure for more than 6 months.

It will be understood that each operation is governed by a number of factors such as water quality, temperature, pH, nature of suspended and dissolved solids, and the like.

By simple routine experiments it was possible to utilize the described chemicals to produce a finished water having the characteristics of suspended solids not being greater than 20 p.p.m. and with the particle size thereof not being in excess of 10 microns.

When experimenting to determine the optimum treatment for a given system, it was observed that while many of the polymers used reduced the turbidity to below 20 p.p.m. the particle size of the remaining turbidity was in excess of 10 microns. These large size particles had the tendency to plug and abrade the nozzles. In other waters, the same polymers produced a finished water having the desired characteristics.

We claim:

1. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece and collecting means for removing the scale contaminated water from the situs of the rolling operation for purposes of reuse in the operation of the high pressure hydraulic spray nozzles, the improvement which comprises continually maintaining the nozzle pressure in the high pressure hydraulic spray nozzles by the expedient of removing foreign scale particles from the water prior to its re-use in said nozzles by means of a polymeric water-soluble chemical whereby the turbidity of said water does not exceed 20 p.p.m. with the largest average particle size of said turbidity being not greater than 10 microns.

2. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzle by the expedient of removing foreign scale particles from the water prior to its re-use in said nozzles by means of a polymeric water-soluble chemical whereby the turbidity in said water does not exceed 10 p.p.m. with the largest average particle size of such turbidity being not greater than 5 microns.

3. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzle by the expedient of removing foreign scale particles from the water prior to its re-use in said nozzles by means of a polymeric organic water-soluble chemical whereby the turbidity of said water does not exceed 10 p.p.m. with the largest average particle size of said turbidity being not greater than 5 microns.

4. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzle by the expedient of removing foreign scale particles from the water prior to its re-use in said nozzles by means of a colloidal metal salt containing a metal from the group consisting of iron and aluminum, whereby the turbidity of said water does not exceed 10 p.p.m. with the largest average particle size of said turbidity being not greater than 5 microns.

5. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece, and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzles by the expedient of removing foreign scale particles from the water prior to its re-use in said nozzles by means of an organic polymeric water-soluble chemical from the group consisting of water dispersible, fatty substituted onium compounds, anionic polyelectrolytes, cationic polyelectrolytes, and non-ionic polypolar polymers where the turbidity of said water does not exceed 10 p.p.m. with the largest average particle size of said turbidity being not greater than 5 microns.

6. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece, and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzles by the expedient of removing foreign scale particles from the water prior to its re-use in said nozzles by means of a cationic water-soluble condensation polymer which is an alkylene polyamine polyfunctional halohydrin condensation polymer whereby the turbidity of said water does not exceed 10 p.p.m. with the largest average particle size of said turbidity being not greater than 5 microns.

7. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece, and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzle by the expedient of removing foreign scale particles from the water prior to its re-use in said nozzles by means of a cationic condensation polymer which is an alkylene polyamine polyfunctional halohydrin condensation polymer and a colloidal inorganic metal salt in the group consisting of alum, sodium aluminate, and iron salts, whereby the turbidity of said water does not exceed 10 p.p.m. with the largest average particle size of said turbidity being not greater than 5 microns.

8. A method for improving the operational efficiency of a hot strip steel rolling mill of the type having at least one roughing scale breaker, at least one roughing stand, and a plurality of finishing stands, said hot strip rolling mill also having a plurality of high pressure hydraulic spray nozzles associated with one or more of the above described pieces of equipment for removing scale from the steel workpiece being rolled therethrough by means of high pressure water being forcibly directed at the scale formed on the surfaces of the steel workpiece, and collecting means for removing the scale contaminated water from the situs of the rolling operation for purposes of re-use in the operation of the high pressure hydraulic spray nozzles, the improvement which comprises continually maintaining the nozzle pressure in the high pressure hydraulic spray nozzles by the expedient of removing foreign scale particles from the water prior to its re-use in said nozzles by means of an acrylamide polymer which has a molecular weight of at least 10,000 whereby the turbidity of said water does not exceed 10 p.p.m. with the largest average particle size of said turbidity being not greater than 5 microns.

References Cited
UNITED STATES PATENTS

| | | | |
|---|---|---|---|
| 2,163,699 | 6/1939 | Paul | 72—40 |
| 3,085,916 | 4/1963 | Zimmie et al. | 134—22 |

RICHARD J. HERBST, *Primary Examiner.*

E. M. COMBS, *Assistant Examiner.*